March 15, 1966 S. GUARNASCHELLI 3,239,931

METHOD OF MAKING PLASTIC LINED METAL TUBING

Filed Dec. 8, 1964

INVENTOR.
STEPHEN GUARNASCHELLI
BY *James P. Malone*

United States Patent Office 3,239,931
Patented Mar. 15, 1966

3,239,931
METHOD OF MAKING PLASTIC LINED
METAL TUBING
Stephen Guarnaschelli, 33 Vassar St., Garden City,
Long Island, N.Y.
Filed Dec. 8, 1964, Ser. No. 418,592
1 Claim. (Cl. 29—520)

This application is a continuation in part of my copending application, Serial No. 272,750 filed April 12, 1963, now abandoned, for Means and Methods for Making Plastic Lined Tubing.

This invention relates to methods of making plastic lined metal tubing.

Many applications require the use of plastic lined pipe or tubing for instance in chemical apparatus where there is a corrosion problem with metal tubing. The only product now available with plastic lining is steel pipe which must be made in the factory at predetermined lengths and which requires prefabricated flanges and joints. One of the difficulties has been fabricating plastic tubing with a good bond between the plastic lining and the outside solid pipe. One of the prior methods has been to heat short lengths of the plastic tubing so that they contract and then insert them into a solid pipe so that they will expand and make a bond to the solid pipe. The difficulty with this method is that only short lengths may be fabricated and it is time consuming and expensive.

Other prior methods push the lining when inserting it. This buckles the lining and is therefore limited to very short lengths.

The present invention provides a new approach whereby unlimited lengths of plastic lined tubing may be fabricated. The present invention eliminates the necessity for solid pipe in factory cut sizes which cannot be bent and which requires many expensive joints and fittings. Limiting the number of fittings in itself is a major improvement since each fitting is a built in source of trouble.

The present invention generally comprises the steps of inserting plastic tubing having a loose fit inside the metal tubing and then drawing down the outside dimension of the metal tubing by passing the metal tubing which contains the plastic tubing, through a drawing die. Therefore, the metal tubing is drawn down in size for instance, 1/32 of an inch and the plastic tubing is somewhat compressed so that it presses outwardly and forms a good bond against the metal tubing. "Teflon" or polytetraethylfluorine is a typical plastic tubing used as a lining.

The advantages of "Teflon" lined metal tubing are many.

The only "Teflon" lined pipes known are in the rigid pipe class such as heavy rigid pipe made in 10 foot lengths. The rigid pipes cannot be bent or cut to length or apply its end fittings applied in the field. They must be made at the factory to specific lengths.

To insert the "Teflon" inner tube in solid pipe requires a special process such as heating, stretching the tube to bring the outside diameter down so it can be pushed through the rigid pipe. Then an additional process is required to expand the Teflon tube tight against the inner wall of the pipe. This method does not always form a perfect bond because the Teflon tube must be kept under compression in order to be correct, and it is very expensive to produce.

When a ductile metal tubing is used, according to the present invention, the lengths are not subject to a 10 foot maximum length but any length can be used, there is no special process needed. An undersize Teflon tube or any plastic tube is inserted into the metal tubing by hand because there is plenty of clearance between the metal tubing and the Teflon, the end of this tubing is pointed to enter a drawing die and by putting this tubing through the reducing die the tubing is brought down sufficiently onto the Teflon tube to put Teflon tube under compression thus forcing a tight bond in a very inexpensive manner.

This tubing and its end fitting can be shipped in bulk, all assemblies can be made in the field, any length can be made to customer specification and fittings attached by the customer. This tubing also eliminates elbows because it can be bent into any shape even into a 180° angle without effecting the inner Teflon tube thus bringing the cost down for Teflon lined tubing compared with lined rigid pipe. Fittings and flanges are described herein.

It is quite important that the Teflon or other plastic be under compression within the tubing, since if it is not the changing applications of pressure inside the line will cause the plastic to flex which will lead to a short life or to a rupture.

It is not possible to produce this compression by axial pressure on the tubing. Axial pressure is very likely to damage the tubing and can only be applied to short lengths in any event.

Another difficulty with plastic lined pipe is in making connections. In making connections it is necessary to have a plastic lining throughout the connection. Therefore, the plastic lining must be flared at the end to be connected. If while making and unmaking the connections there is a rubbing at this junction, that is against the flare of the plastic lining, then the plastic lining will be worn and will rupture causing difficulties.

The present invention provides a connecting joint for plastic lined tubing wherein there is no rubbing of the flare edge of the plastic lining.

The connecting fitting disclosed herein comprises a metal tube lined with plastic tubing, the plastic tubing being flared at one end and the metal tubing flared at that end, the plastic tubing extending slightly further than the metal end, a collar having external threads is mounted on the metal tubing abutting the flared end of the tubing, a hollow plastic bushing having a beveled end is adapted to be fitted into the flared end of the plastic lining. The plastic bushing has an external flange behind the beveled end and there is a nut adapted to fit over the plastic bushing, the nut has an internal flange which is adapted to fit behind the external flange on the plastic member, and the nut has internal threads which are adapted to engage in threads of the collar.

Therefore, when the joint is drawn tight by turning the nut the contact between the nut and the plastic bushing flange is a slipping one so that as the connection is drawn tight there is no turning surface bearing against the flared end of the plastic lining, all the slippage is being taken up by the slip joint between the nut and the plastic bushing.

Accordingly, a principal object of the invention is to provide new and improved methods for making plastic lined tubing.

Another object of the invention is to provide new and improved methods for making the plastic lined tubing comprising the steps of inserting plastic tubing having a loose fit inside the metal tubing and drawing down the outside dimension of said tubing by passing said metal tubing containing said plastic tubing through a drawing die whereby said metal tubing and said plastic tubing are compressed so that a good bond is formed between them.

Another object of the invention is to provide new and improved methods for providing plastic lined tubing without deforming the plastic lining.

These and other objects of the invention will be apparent from the following specification and drawings of which:

FIGURES 1 and 2 show the process.

Figure 1:
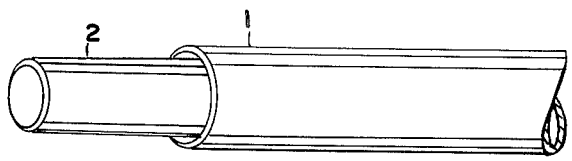
FIGURES 1 and 2 are side views illustrating the method of drawing down from the metal tubing to provide good bond between the metal tubing and the plastic liner tubing, FIGURE 2 being partially in section.

FIGURE 1 shows the metal tubing 1 and the plastic tubing 2 being inserted loosely in the metal tubing 1.

Figure 2:
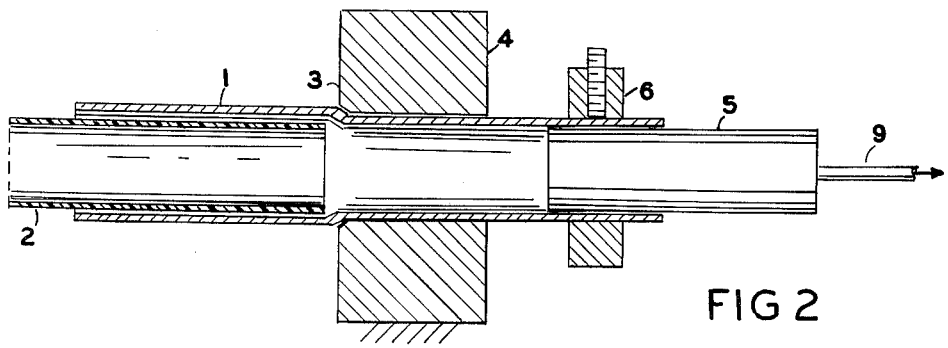

FIGURE 2 shows a sectional view illustrating the method of drawing down the metal tubing 1 having the plastic lining tubing 2. The problem is to provide a good bond between the lining and the outer metal tubing which may for instance be copper tubing or any tubing which can be drawn down.

The general method is to insert the plastic tubing with a loose fit inside the metal tubing and then to draw down the metal tubing and also placing the inside with plastic lining tubing under compression so that there will be a force inside the plastic lining pushing out the inside of the surface of the metal tubing to provide a good type bond.

The process is performed by the following steps:

The end of the metal tubing is first turned down in a lathe for a distance 3 sufficient to extend through the drawing die 4 and to extend sufficiently through so that steel pin 5 may be inserted in the metal tube and clamped thereto by means of the clamp 6.

The plastic lining tube 2 is initially placed inside the metal tubing with a relatively loose fit. The steel pin 5 is then connected to a pulling apparatus 9 and the tubing is then pulled through the drawing die 4 so that the outside dimension of metal tubing is reduced so that the lining is gripped and compressed. No pushing of the lining is required. Pushing is objectionable since it buckles the tubing and limits the process to short lengths.

Metal tubing with the plastic lining of the present invention may be formed or bent by conventional tube bending apparatus of the type used by plumbers.

The plastic lining 2 is also compressed which leaves the plastic lining in a state of compression and exerting a force outwardly against the inside surface of the metal tubing.

A typical example is metal tubing of $9/16$ outside diameter and having a .05 inch wall was reduced approximately $1/16$ to about $1/2$ inch outside diameter. The drawing process is a cold proces as there is no heat required.

Figure 3:
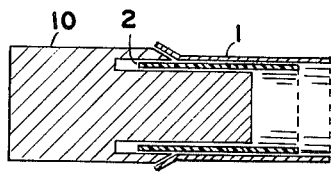
FIGURE 3 is a side sectional view of a tool for flaring the metal tubing without distorting the plastic lining.
Figure 4:
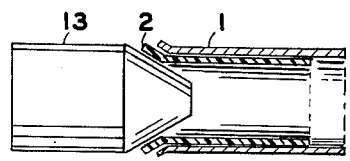
FIGURE 4 is a side view partly in section, of a tool for flaring the plastic lining.

FIGURE 3 shows a tool 10 which is adapted to flare the metal tube without disturbing the plastic tubing 2. The tool has receses 11 and 12 adapted to receive the plastic tubing without bending. After the metal tubing is flared the plastic tubing then flared by pressing the tool 13, FIGURE 4, against the plastic tubing. The metal tubing end is preferably cut back slightly before flaring.

Figure 5:
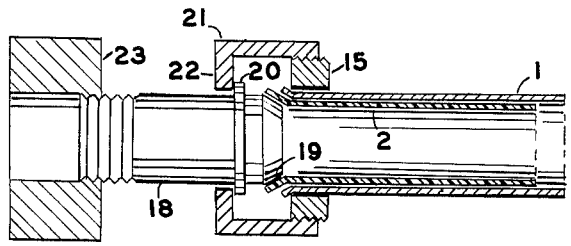
FIGURE 5 is a side view partly in section, showing a connecting joint for plastic lined tubing which eliminates wear of the flared end of the plastic lining.

FIGURE 5 shows a connection fitting for plastic lined tubing and the metal tube and the plastic tubing 2 are flared as previously described. A collar 15 is placed on the metal 1 so that it bears against the flared end of the metal tube. The collar 15 has external threads 16. The metal tubing 1 is preferably cut back slightly before flaring.

A plastic bushing 18 having a beveled end 19 and an external flange 20 is placed with the beveled end against the flared end of the plastic. The metal 21 nut is placed on the plastic bushing and has an internal flange 22 which fits against the external flange of the plastic bushing 21.

The other end of the plastic bushing may be a plastic connection to the machine 23 or the other end of the plastic bushing could be identical if desired.

The problem in a connection of this type is to avoid rotation on a flared end of the plastic tube causing it to wear. This condition is avoided by the present connection since the bearing of the flange 21 against flange 20 tends to slip easily since the plastic bushing is made using a smooth plastic, for instance Teflon. There is no tendency of the tubing 1 to rotate as nut 21 screws onto the collar 15.

Many modifications may be made by those who desire to practice the invention without departing from the scope thereof which is defined by the following claim.

I claim:

The process of making Teflon plastic lined metal tubing of substantial length without plastically deforming the ends of the plastic lining comprising the steps of;
  inserting a substantial length of Teflon plastic tubing having substantial resiliency and having a loose fit inside said metal tubing,
  turning down one end of said metal tubing beyond the end of said Teflon tubing,
  inserting said end in a drawing die having smaller dimensions than the original outside dimensions of said tubing whereby the moving of said metal and plastic tubing through said die causes said metal tubing to grip said plastic tubing, and
  moving said metal tubing containing said Teflon plastic tubing through said drawing die solely by pulling said turned down end,
  said Teflon plastic tubing being moved solely by pulling grip of said metal tubing on said plastic tubing,
  whereby said metal tubing is drawn onto said plastic tubing such that said plastic tubing is compressed within its elastic limit without elongating said plastic lining and developing detrimental axial stresses therein so that a good compression bond betwen said metal and plastic tubing is formed.

References Cited by the Examiner

UNITED STATES PATENTS

| | | | |
|---|---|---|---|
| 359,703 | 3/1887 | Allderdice | 205—8 |
| 1,984,115 | 12/1934 | Cooper | 29—520 XR |
| 2,198,149 | 4/1940 | Bangert | 29—516 XR |
| 2,828,537 | 4/1958 | Pischke et al. | 29—517 |
| 2,886,170 | 5/1959 | Kerr | 205—8 |

FOREIGN PATENTS 575,424  5/1959  Canada.

WHITMORE A. WILTZ, *Primary Examiner.*